US011809732B2

(12) United States Patent
Xie et al.

(10) Patent No.: US 11,809,732 B2
(45) Date of Patent: *Nov. 7, 2023

(54) METHOD AND APPARATUS OF DATA MIGRATION BASED ON USE ALGORITHM

(71) Applicant: HUAWEI TECHNOLOGIES CO., LTD., Shenzhen (CN)

(72) Inventors: Jin Xie, Shenzhen (CN); Gang Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,499

(22) Filed: Aug. 23, 2022

(65) Prior Publication Data

US 2023/0053968 A1 Feb. 23, 2023

Related U.S. Application Data

(63) Continuation of application No. 17/213,608, filed on Mar. 26, 2021, now Pat. No. 11,435,931, which is a
(Continued)

(30) Foreign Application Priority Data

Oct. 31, 2018 (CN) .......................... 201811284464.4

(51) Int. Cl.
*G06F 3/06* (2006.01)
(52) U.S. Cl.
CPC ............ *G06F 3/0647* (2013.01); *G06F 3/061* (2013.01); *G06F 3/067* (2013.01)

(58) Field of Classification Search
CPC ........... G06F 3/0647–065; G06F 3/061; G06F 3/0683
See application file for complete search history.

(56) References Cited

U.S. PATENT DOCUMENTS 10,083,199 B1 * 9/2018 Sharma ............... G06F 16/2365
2002/0144070 A1 10/2002 Watanabe et al.
(Continued)

FOREIGN PATENT DOCUMENTS

CN 101901250 A 12/2010
CN 103198028 A 7/2013
(Continued)

OTHER PUBLICATIONS

Huawei., "Huawei OceanStor Dorado V3 All-Flash Storage Systems, Performance Technical White Paper", Oct. 30, 2018, XP093046711, 31 Pages.
(Continued)

*Primary Examiner* — Chie Yew
(74) *Attorney, Agent, or Firm* — Maier & Maier, PLLC

(57) ABSTRACT

A memory data migration method, apparatus, and system are provided. During memory migration, data is classified into two parts based on a hot and cold degree of the data. Hot data is directly migrated, and cold data is written into a shared storage device shared by memories. When needing to be used in a destination-end memory, the cold data may be read from the shared storage device. This reduces an amount of data that needs to be migrated to the destination-end memory, thereby improving memory migration efficiency.

17 Claims, 9 Drawing Sheets

Computing system 100

Related U.S. Application Data continuation of application No. PCT/CN2019/090364, filed on Jun. 6, 2019.

(56) References Cited

U.S. PATENT DOCUMENTS

| | | | |
|---|---|---|---|
| 2006/0037025 A1* | 2/2006 | Janssen | G06F 9/4881 |
| | | | 718/107 |
| 2008/0126725 A1* | 5/2008 | Morishita | G06F 11/2069 |
| | | | 711/E12.103 |
| 2012/0173831 A1 | 7/2012 | Rubio et al. | |
| 2012/0185856 A1 | 7/2012 | Ashihara et al. | |
| 2013/0073820 A1* | 3/2013 | Watanabe | G06F 3/0659 |
| | | | 711/E12.103 |
| 2015/0067258 A1 | 3/2015 | Jung et al. | |
| 2016/0034197 A1 | 2/2016 | Ninomiya | |
| 2016/0274819 A1 | 9/2016 | Choi | |
| 2018/0024853 A1 | 1/2018 | Warfield et al. | |
| 2018/0157654 A1 | 6/2018 | Dain et al. | |
| 2019/0213175 A1 | 7/2019 | Kong et al. | |

FOREIGN PATENT DOCUMENTS

| | | |
|---|---|---|
| CN | 103902593 A | 7/2014 |
| CN | 103108029 B | 6/2016 |
| CN | 105653591 A | 6/2016 |
| CN | 105677736 A | 6/2016 |
| CN | 106484330 A | 3/2017 |
| CN | 106934001 A | 7/2017 |
| CN | 109582223 A | 4/2019 |
| JP | 2008027335 A | 2/2008 |
| WO | 2018121120 A1 | 7/2018 |

OTHER PUBLICATIONS

Huawei., "Huawei OceanStor 6800 V3 and 6900 V3 Converged Storage Systems, Technical White Paper", Aug. 2014, XP093046712, 42 Pages.

Huawei., "Huawei OceanStor Dorado V3 All-Flash Storage Systems, Technical White Paper", Oct. 30, 2018, XP055937861, 81 Pages.

Huawei., "Huawei presents OceanStor architecture at SFD15", Silverton Consulting, May 21, 2018, XP093045212, 6 Pages.

Tech Field Day., "Huawei OceanStor Dorado Architectural Deep Dive with Chun Liu", Mar. 13, 2018, XP093045209, 2 Pages.

Niu et al., "Hybrid Storage Systems: A Survey of Architectures and Algorithms", IEEE Access, vol. 6, Feb. 7, 2018, XP055571284, 22 pages.

"Amazon Simple Storage Service", Developer Guide, Dec. 13, 2016, XP093038177, 400 Pages.

"Uploading Large Archives in Parts (Multi part Unload)", Amazon Glacier, Dec. 24, 2017, XP093045514, 4 Pages.

"c++—*Large File I/0 Async* vs. *Multi-Threaded Sync I/10*", Stack Overflow, Feb. 2, 2014, XP093046585, 2 Pages.

\* cited by examiner

METHOD AND APPARATUS OF DATA MIGRATION BASED ON USE ALGORITHM

CROSS-REFERENCE TO RELATED APPLICATIONS

This application is a continuation of U.S. patent application Ser. No. 17/213,608, filed on Mar. 26, 2021, now U.S. patent Ser. No. 11/435,931, which is a continuation of International Application No. PCT/CN2019/090364, filed on Jun. 6, 2019, which claims priority to Chinese Patent Application No. 201811284464.4, filed on Oct. 31, 2018. All of the aforementioned applications are hereby incorporated by reference in their entireties.

TECHNICAL FIELD

The embodiments relate to a data migration method, and in particular, to a memory data migration method and apparatus.

BACKGROUND

A database is a warehouse that organizes, stores, and manages data based on a data structure. Currently, many databases are in-memory databases, namely, high-performance real-time database platforms based on an in-memory computing technology. The in-memory database stores data in a memory for direct operations, so that a data processing speed is faster. However, because memory usage of the in-memory database is high, the memory is more likely to be damaged, and impact of the damage is greater.

To reduce the impact caused by the memory damage, an existing server usually has a memory hot-plugging function that allows a user to replace a system memory in a case in which an operating system continuously runs. During this period, neither the system needs to be shut down, nor a power supply needs to be cut off. This improves a capability that the system has to recover the memory promptly when the memory is faulty; improves system reliability; and minimizes the impact that is of the memory damage and that is on a current service. In a process of performing the memory hot-plugging, data in a memory removed from a current system needs to be migrated, for example, migrated to free space of another memory.

In a current memory data migration solution, data in a memory is usually migrated from one memory to another memory in a form of memory pages. In this manner, another memory page can be migrated only after migration of one memory page is completed. Consequently, memory migration efficiency is low. In addition, if a memory page on which currently to-be-migrated data is located has an application program occupying a memory resource, for example, new data is written into the memory page, a migration process is suspended, to wait for completion of a service process occupied by the application program until the memory resource is released. In a high service pressure scenario, frequent access to the memory by various applications further reduces the memory data migration efficiency.

SUMMARY

The embodiments provide a memory data migration method and apparatus, where to-be-migrated data is classified. A part of data is migrated to another memory, and the other part of data is migrated to a shared storage device, so that memory data migration efficiency can be improved. In addition, a service process is blocked during memory data migration to ensure that the memory migration efficiency is not reduced in a high service pressure scenario.

According to a first aspect, the embodiments provide a data migration method. The method is applied to a computing system. The computing system includes a first memory and a second memory. The method includes: classifying to-be-migrated data into first to-be-migrated data and second to-be-migrated data, where the to-be-migrated data is located in the first memory; migrating the first to-be-migrated data to the second memory; and writing the second to-be-migrated data into a storage device, where the storage device is a shared storage device of the first memory and the second memory.

In the foregoing method, when memory data is migrated, the to-be-migrated data is classified into two parts, where one part of data is migrated to another memory, and the other part of data is written into the shared storage device. In this way, memory data migration efficiency can be improved, and a memory data migration speed is increased.

According to the first aspect, in a possible implementation, the computing system includes a service process and a migration process, the migration process is used to migrate the to-be-migrated data, the service process is a process using the to-be-migrated data, and before the migrating the first to-be-migrated data to the second memory, the method further includes: adjusting a priority of the migration process or a priority of the service process, to enable the priority of the migration process to be higher than the priority of the service process. In this way, the computing system can preferentially complete memory data migration without being interrupted by the service process, and this increases the memory data migration speed.

According to the first aspect, in another possible implementation, after the migrating the first to-be-migrated data to the second memory, the method further includes: restoring the priority of the migration process or the priority of the service process. In this way, content of the service process may be executed after the memory data migration is completed, and this improves computing system stability.

According to the first aspect, in another possible implementation, the method further includes: generating, by the computing system, new data; and writing the new data into the storage device. In this way, when generating the new data, the computing system may directly write the data into the storage device without affecting the memory data migration, and this increases the memory data migration speed.

According to the first aspect, in another possible implementation, the computing system includes at least two computer apparatuses, the first memory is located in a first computer apparatus of the at least two computer apparatuses, and the second memory is located in a second computer apparatus of the at least two computer apparatuses. The sending the first to-be-migrated data to the second memory in at least two memories includes: reading, by a first operating system of the first computer apparatus, the first to-be-migrated data; encapsulating, by the first operating system, the first to-be-migrated data to obtain first encapsulated data; sending, by the first operating system, the first encapsulated data to a second operating system of the second computer apparatus; decapsulating, by the second operating system, the first encapsulated data to obtain the to-be-migrated data; and sending, by the second operating system, the to-be-migrated data to the second memory. In this way, the memory data migration method provided can be implemented between different computer apparatuses.

According to the first aspect, in another possible implementation, the classifying to-be-migrated data into first to-be-migrated data and second to-be-migrated data includes: classifying the to-be-migrated data into the first to-be-migrated data and the second to-be-migrated data based on a least recently used (LRU) algorithm. For example, the first to-be-migrated data is most recently used data whose time threshold to a current time point is not greater than a first threshold, and the second to-be-migrated data is most recently used data whose time threshold to the current time point is greater than the first threshold. In this way, data frequently used by the computer apparatus may be migrated to the second memory as the first to-be-migrated data, and data not frequently used by the computer apparatus may be migrated to the shared storage apparatus as the second to-be-migrated data. This improves the memory data migration efficiency.

According to the first aspect, in another possible implementation, the classifying to-be-migrated data into first to-be-migrated data and second to-be-migrated data includes:

classifying the to-be-migrated data into the first to-be-migrated data and the second to-be-migrated data based on a least frequently used page (LFU) algorithm. For example, the first to-be-migrated data is data whose use frequency exceeds a second threshold within a latest preset time period, and the second to-be-migrated data is data whose use frequency does not exceed the second threshold within the latest preset time period. In this way, the memory data migration efficiency can be improved.

According to the first aspect, in another possible implementation, the method further includes: reading third data from the storage device, and writing the third data into the second memory, where the second to-be-migrated data includes the third data, for example, all or some data of the second to-be-migrated data is read from the storage device and written into the second memory. In this way, when needing all or some data of the second to-be-migrated data needs to be used in the second memory, the data may be read from the storage device, and this improves the computing system stability.

According to a second aspect, the embodiments provide a data migration apparatus. The apparatus is applied to a computing system, and the computing system includes a first memory and a second memory. The apparatus includes: a classification module, configured to classify to-be-migrated data into first to-be-migrated data and second to-be-migrated data, where the to-be-migrated data is located in the first memory; a migration module, configured to migrate the first to-be-migrated data to the second memory, and write the second to-be-migrated data into a storage device. The storage device is a shared storage device of the first memory and the second memory.

According to the second aspect, in a possible implementation, the computing system includes a service process and a migration process, the migration process is used to migrate the to-be-migrated data, the service process is a process using the to-be-migrated data, and the apparatus further includes an adjustment module, configured to: before the first to-be-migrated data is migrated to the second memory, adjust a priority of the migration process or a priority of the service process, where the adjusted priority of the migration process is higher than the priority of the service process.

According to the second aspect, in another possible implementation, the adjustment module is further configured to: after the first to-be-migrated data is migrated to the second memory, restore the priority of the migration process or the priority of the service process.

According to the second aspect, in another possible implementation, the migration module is further configured to: when the computing system generates new data, write the new data into the storage device.

According to the second aspect, in another possible implementation, the classifying to-be-migrated data into first to-be-migrated data and second to-be-migrated data includes: classifying the to-be-migrated data into the first to-be-migrated data and the second to-be-migrated data based on an LRU algorithm. For example, the first to-be-migrated data is most recently used data whose time threshold to a current time point is not greater than a first threshold, and the second to-be-migrated data is most recently used data whose time threshold to the current time point is greater than the first threshold.

According to the second aspect, in another possible implementation, the classifying to-be-migrated data into first to-be-migrated data and second to-be-migrated data includes: classifying the to-be-migrated data into the first to-be-migrated data and the second to-be-migrated data based on an LFU algorithm. For example, the first to-be-migrated data is data whose use frequency exceeds a second threshold within a latest preset time period, and the second to-be-migrated data is data whose use frequency does not exceed the second threshold within the latest preset time period.

According to the second aspect, in another possible implementation, the migration apparatus is further configured to: read third data from the storage device, and write the third data into the second memory, where the second to-be-migrated data includes the third data, for example, all or some data of the second to-be-migrated data is read from the storage device and written into the second memory.

According to a third aspect, the embodiments provide a computing system. The computing system includes a migration apparatus, a first memory, a second memory, and a storage device. The migration apparatus is configured to: classify to-be-migrated data into first to-be-migrated data and second to-be-migrated data, where the to-be-migrated data is located in the first memory, migrate the first to-be-migrated data to the second memory, and write the second to-be-migrated data into the storage device. The storage device is configured to receive the second to-be-migrated data, where the storage device is a shared storage device of the first memory and the second memory.

According to the third aspect, in a possible implementation, the computing system includes a service process and a migration process, the migration process is used to migrate the to-be-migrated data, the service process is a process using the to-be-migrated data, and the migration apparatus is further configured to: before the first to-be-migrated data is migrated to the second memory, adjust a priority of the migration process or a priority of the service process, to enable the priority of the migration process to be higher than the priority of the service process.

According to the third aspect, in another possible implementation, the migration apparatus is further configured to: after the first to-be-migrated data is migrated to the second memory, restore the priority of the migration process or the priority of the service process.

According to the third aspect, in another possible implementation, the computing system generates new data; the migration apparatus is further configured to write the new data into the storage device; and the storage device is further configured to receive the new data.

According to the third aspect, in another possible implementation, the computing system includes at least two computer apparatuses, the first memory is located in a first computer apparatus of the at least two computer apparatuses, and the second memory is located in a second computer apparatus of the at least two computer apparatuses. The sending the first to-be-migrated data to the second memory in at least two memories includes: reading, by a first operating system of the first computer apparatus, the first to-be-migrated data; encapsulating, by the first operating system, the first to-be-migrated data to obtain first encapsulated data; sending, by the first operating system, the first encapsulated data to a second operating system of the second computer apparatus; decapsulating, by the second operating system, the first encapsulated data to obtain the to-be-migrated data; and sending, by the second operating system, the to-be-migrated data to the second memory.

According to the third aspect, in another possible implementation, the classifying to-be-migrated data into first to-be-migrated data and second to-be-migrated data includes: classifying the to-be-migrated data into the first to-be-migrated data and the second to-be-migrated data based on an LRU algorithm. For example, the first to-be-migrated data is most recently used data whose time threshold to a current time point is not greater than a first threshold, and the second to-be-migrated data is most recently used data whose time threshold to the current time point is greater than the first threshold.

According to the third aspect, in another possible implementation, the classifying to-be-migrated data into first to-be-migrated data and second to-be-migrated data includes: classifying the to-be-migrated data into the first to-be-migrated data and the second to-be-migrated data based on an LFU algorithm. For example, the first to-be-migrated data is data whose use frequency exceeds a second threshold within a latest preset time period, and the second to-be-migrated data is data whose use frequency does not exceed the second threshold within the latest preset time period.

According to the third aspect, in another possible implementation, the migration apparatus is further configured to: read third data from the storage device, and write the third data into the second memory, where the second to-be-migrated data includes the third data, for example, all or some data of the second to-be-migrated data is read from the storage device and written into the second memory.

According to a fourth aspect, the embodiments provide a computer apparatus. The computer apparatus includes a memory and a processor, the memory stores program code, and the processor is configured to invoke the program code in the memory to perform the data migration method provided in any one of the first aspect or the possible implementations of the first aspect.

According to a fifth aspect, the embodiments provide a readable medium, including an execution instruction. When a processor of a computing device executes the execution instruction, the computing device performs the method according to any one of the first aspect or the possible implementations of the first aspect.

DETAILED DESCRIPTION OF THE EMBODIMENTS

Figure 1:
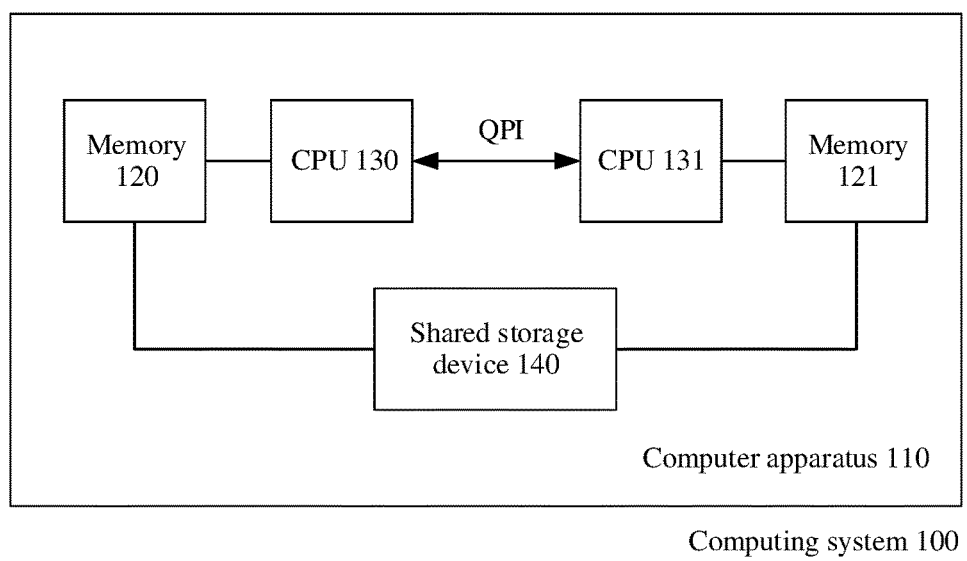
FIG. 1 is a schematic diagram of a system architecture according to an embodiment.

To make the objectives, technical solutions, and advantages more understandable, the following provides detailed descriptions. The detailed descriptions provide various embodiments of a device and/or a process through block diagrams, flowcharts, and/or examples. These block diagrams, flowcharts, and/or examples include one or more functions and/or operations, so a person of ordinary skill in the art may understand that each function and/or operation in the block diagrams, the flowcharts, and/or the examples may be performed independently and/or jointly through much hardware, software, and firmware, and/or any combination thereof.

In a computer apparatus, data addresses may be classified into two types: a physical address and a logical address. The physical address is an address signal that is for addressing a physical memory and that is at an external address of a central processing unit ( ) and is a final result address of address changes. The logical address is an offset address generated by a program and has a mapping relationship with the physical address. When data is migrated between different memories, a logical address of the data is usually not changed. Instead, after to-be-migrated data is transmitted from a source-end memory to a destination-end memory, a mapping relationship is established between the logical address of the data and a new physical address.

In the prior art, when memory data migration is performed, the to-be-migrated data is usually migrated from the source-end memory to the destination-end memory in a form of memory pages. Paging is to divide address space into a plurality of pages. The CPU determines several specifications of a size of each page, and then an operating system determines the size of each page. Usually, the size of each page is 4 KB. In this way, migration of data on one memory page needs to be completed before migration of data on a next memory page, and this leads to a comparatively slower migration speed.

A basic unit for the CPU to execute a program is process, namely, a basic unit for the system to allocate and schedule resources. When the memory data migration is performed, it is considered that a corresponding process of the CPU is used to perform the migration operation. However, in a high service pressure scenario, because a service needs to frequently access a memory, a service-related application program occupies a memory resource, and a migration process needs to wait for a service process to complete an operation until the memory resource is released. Therefore, during memory migration, the migration process usually needs to be interrupted to wait for another process, and this further decreases an actual migration speed.

To resolve the prior-art problem of the slow memory data migration speed, in the solution provided in the embodiments, the computer apparatus classifies the to-be-migrated data. Cold data that is not frequently used and data that does not have great impact on service performance during data migration are written into a shared storage device, and remaining data is migrated to another memory. In this way, memory data migration efficiency can be improved, and the memory data migration speed can be increased. In addition, in the high service pressure scenario, a priority of the migration process is adjusted to be higher than that of a service process that is being migrated, or data that is newly written into the memory is directly stored in the shared storage device, to reduce impact that is of the service process and that is on the memory data migration. In this way, the memory data migration speed is not decreased.

FIG. 1 is a schematic structural diagram of a computer cluster according to an embodiment. As shown in FIG. 1, a computing system 100 includes at least one computer apparatus 110. The computer apparatus 110 uses a multi-node architecture, for example, may use a non-uniform memory access (NUMA) architecture. In a multi-node structure such as the NUMA, each node may include one or more CPUs, and each CPU may be correspondingly allocated with a memory resource. CPUs of each node in the computer apparatus are connected through a quick path interconnect (QPI) cable. QPI is a serial high-speed point-to-point connection protocol based on packet transmission and performs transmission by using a differential signal and a special clock, to implement direct interconnection between chips. The computer apparatus has a shared storage device 140. The shared storage device 140 may be a high-speed random access memory (RAM) memory, or may be a non-volatile memory, for example, a magnetic disk memory. The shared storage device 140 may be placed inside the computer apparatus 110 or may be an external storage array. In FIG. 1, that the shared storage device is placed inside the computer apparatus is merely an example, and this is not limited in the embodiments. Memories of all nodes of the computer apparatus may read the shared storage device.

Figure 2:
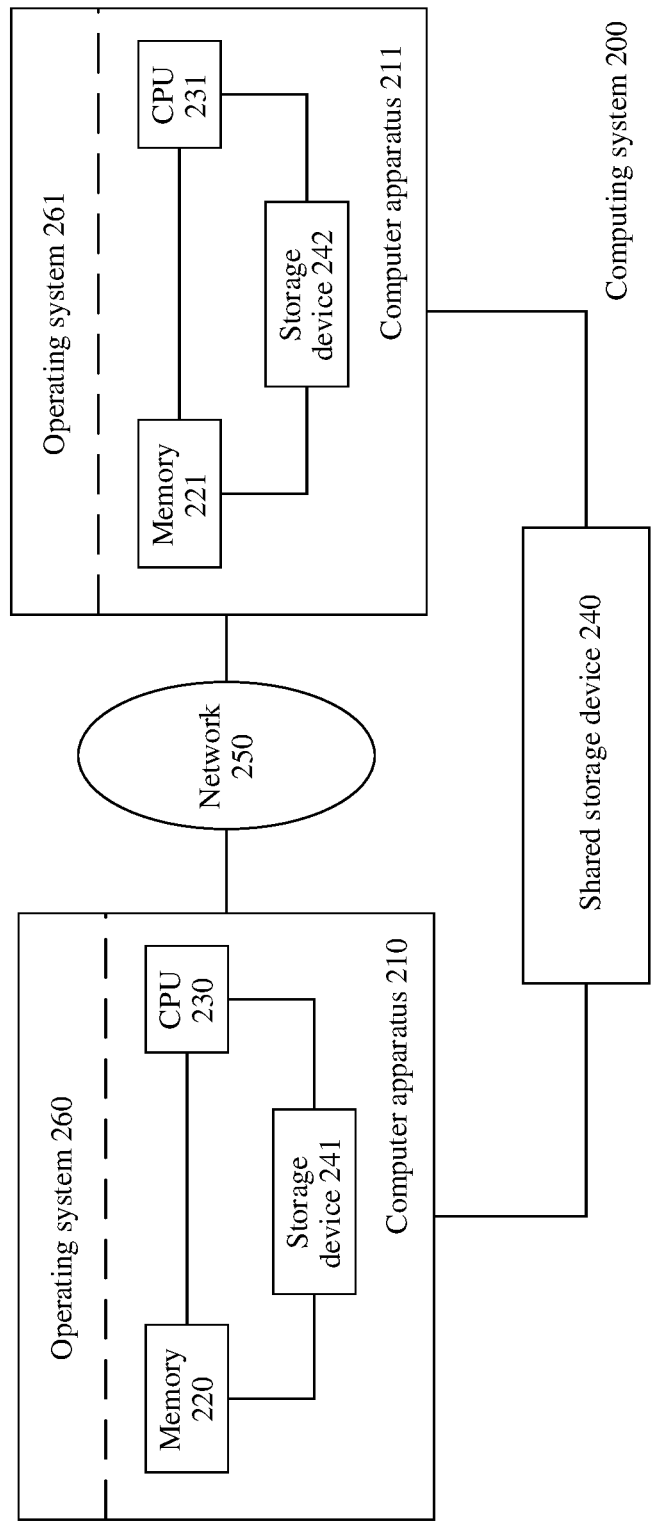
FIG. 2 is a schematic diagram of another system architecture according to an embodiment.

FIG. 2 is a schematic structural diagram of another computing system according to an embodiment. As shown in FIG. 2, the computing system 200 includes at least two computer apparatuses, namely, a computer apparatus 210 and a computer apparatus 211. The computer apparatus in the computing system 200 may be the multi-node architecture shown in FIG. 1 or may be a single-node architecture. In FIG. 2, the single-node architecture is used as an example for description. When the computer apparatus 210 and the computer apparatus 211 need to perform memory data migration, a source-end memory 220 first sends to-be-migrated data to an operating system 260 of the computer apparatus 210 in which the source-end memory 220 is located. After receiving the to-be-migrated data, the operating system 260 obtains a location of the to-be-migrated data in the memory 220, and sends, through a network 250, the data to an operating system 261 of the computer apparatus 211 in which a destination-end memory 221 is located. The operating system 261 then writes the data into the destination-end memory 221 of the computer apparatus 211, to complete the memory data migration. The computing system 200 further includes a shared storage device 240. Both the computer apparatus 210 in which the source-end memory 220 is located and the computer apparatus 211 in which the destination-end memory 221 is located are connected to the shared storage device 240, in other words, both the source-end memory 220 and the destination-end memory 221 may read data from or write data into the shared storage device 240. The shared storage device 240 may be connected to the computer apparatus through a connection line, or may use an architecture similar to a storage area network (SAN) to be connected to the computer apparatus through a fiber channel (FC) switch. This is not limited in the embodiments. When memory data needs to be migrated between two computer apparatuses, a part of the to-be-migrated data may also be written from the source-end memory into the shared storage device, and the destination-end computer apparatus extracts the part of the to-be-migrated data from the shared storage device and writes the part of the to-be-migrated data into the memory of the destination-end computer apparatus, to complete the memory data migration.

Figure 3:
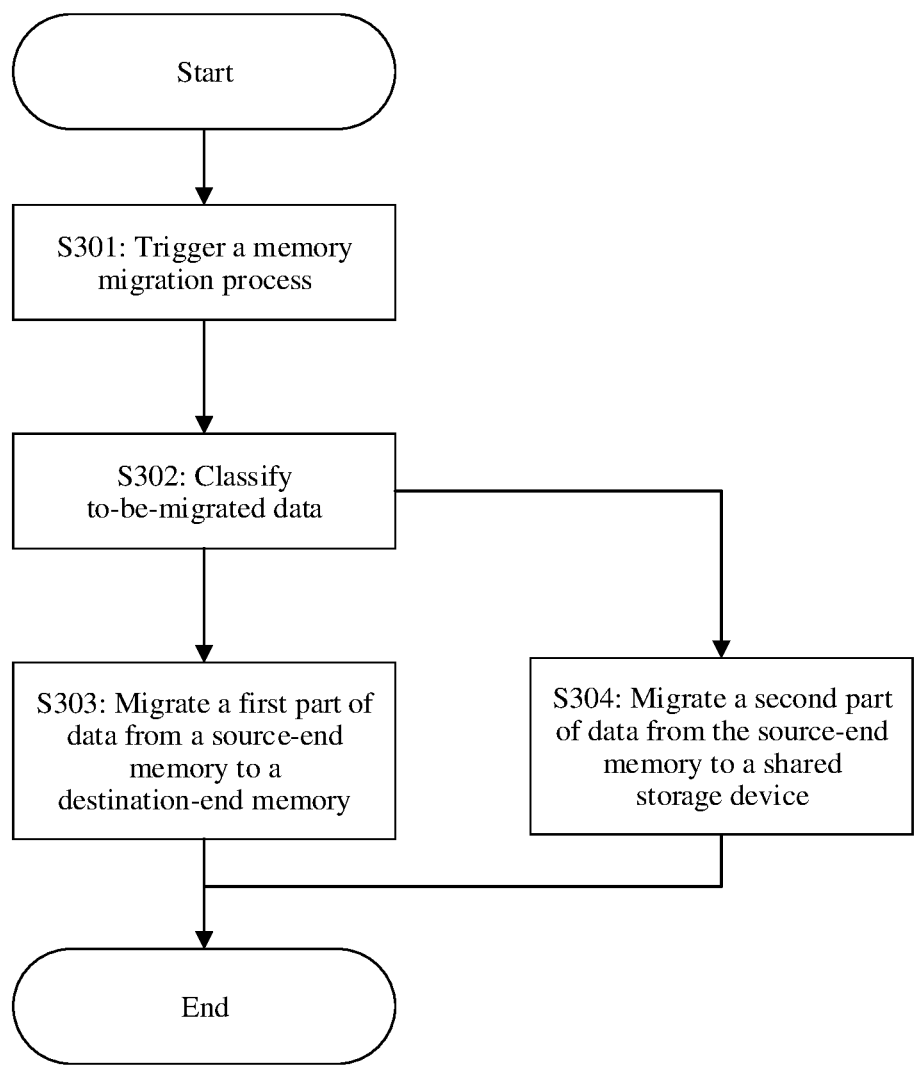
FIG. 3 is a schematic flowchart of an embodiment according.

FIG. 3 is a schematic flowchart according to an embodiment. The schematic flowchart shows that memory data migration is performed between different nodes of a computer apparatus in the computing system shown in FIG. 1. As shown in FIG. 3, a procedure may be divided into the following steps.

S301: Trigger a memory data migration process.

The memory data migration is usually triggered by two cases. One case is that a basic input output interface (BIOS) delivers a memory migration signal to an operating system, and the operating system triggers a memory migration action. Alternatively, the operating system or a third-party application directly delivers the memory migration signal and triggers the memory data migration process.

S302: Classify to-be-migrated data.

A memory daemon is a monitoring and decision-making tool for the memory migration and can monitor states and usage of memories of the entire system in real time. In this embodiment, after the memory migration is triggered, the memory daemon classifies the to-be-migrated data into two parts. A first part of data is to be written from a source-end memory 120 into a destination-end memory 121. A second part of data is to be written into a shared storage device 140, and when the destination-end memory 121 needs this part of data, the part of data is then read from the shared storage device 140.

In this embodiment, the to-be-sent data may be classified into two parts of data according to a plurality of rules. In an implementation of the embodiments, a least recently used (LRU) algorithm or a least frequently used (LFU) page replacement algorithm may be used to determine which part of data in the sent data is hot data and which part of data in the sent data is cold data. The to-be-migrated data is classified into the first part of data and the second part of data based on whether the to-be-migrated data is the hot data or the cold data. The hot data is online data that needs to be frequently accessed by a computing node. The cold data is offline data that is not frequently accessed, such as enterprise backup data, service and operation log data, bill and statistic data. The two types of data have different access frequencies. In a database, the hot data needs to be stored in a memory for computing and deployment because the access frequency is high and an efficiency requirement is high. The cold data may be written into the shared storage device because the access frequency is low and the efficiency requirement is low, in addition, operations such as compression and deduplication may be performed on the part of data, to further reduce storage costs. In this embodiment, the to-be-migrated data may also be classified based on a service requirement. For example, for a part of data that has great impact on service performance during memory migration, the part of data is migrated from the source-end memory 120 to the destination-end memory 121. However, for data that has little impact on the service performance during memory migration or in which it is not strictly required that no data is lost during memory migration, the part of data is written into the shared storage device 140, and when the destination-end memory 121 needs the part of data, the part of data is written from the shared storage device 140 into the destination-end memory 121.

Additionally, both the LRU algorithm and the LFU algorithm are algorithms related to a virtual page-based storage management service. The LRU algorithm means that a memory page that is not used for a longest time is first eliminated or replaced. For example, specific duration is preset, and data that is not recently used in the preset duration is used as the cold data, namely, the second part of data, for processing. Other data is used as the hot data, namely, the first part of data, for processing. The LFU algorithm means that a memory page that is accessed for a minimum quantity of times in a specific time period is evicted or replaced. For example, specific duration and a quantity of use times are preset, and data that is recently used in the preset duration and in which a quantity of times does not exceed the preset quantity of use times is used as the cold data, namely, the second part of data, for processing. Other data is used as the hot data, namely, the first part of data, for processing.

The foregoing provided method for classifying the to-be-migrated data is merely an example and should not be understood as a limitation on. It may be understood that a classification rule may be set based on an actual service requirement, and the to-be-migrated data is classified according to the set classification rule.

S303: Migrate a first part of data from a source-end memory 120 to a destination-end memory 121.

For data transmission, an amount of data in each memory data migration may be selected based on the state of the memory. The memory data migration means that the data transmission is usually performed according to the transmission control protocol/internet protocol (TCP/IP) protocol, and a handshake needs to be performed when each data transmission is performed. If the amount of data in each memory data migration is too small, data transmission efficiency is low. However, if the amount of data in each memory data migration is excessively large, each transmission takes a comparatively long time. If a fault occurs during transmission, and retransmission needs to be performed, an amount of retransmitted data is comparatively large. Therefore, a proper amount of data needs to be selected for each memory data migration.

To improve the efficiency, a multithreading mode may be used to perform the memory data migration. For example, when an amount of the to-be-migrated data is greater than a preset value, or the to-be-migrated data is discontinuous in the source-end memory 120, a multithreading memory data migration may be started.

Figure 4:
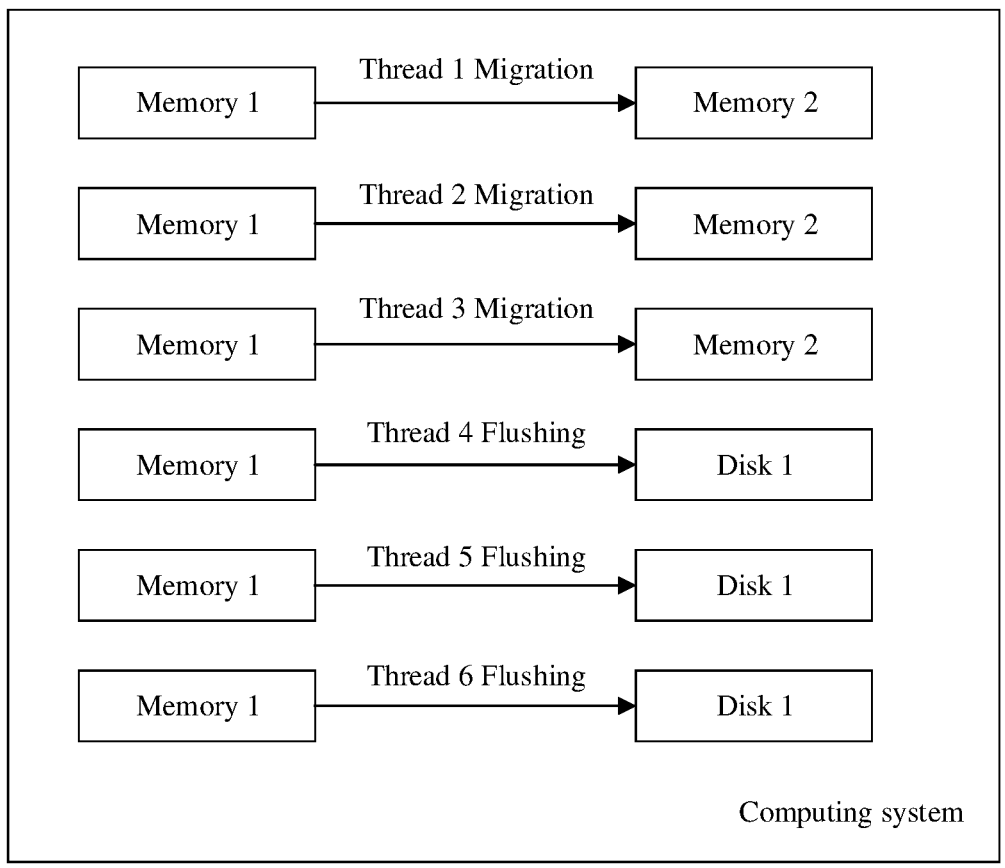
FIG. 4 is a schematic diagram of memory data migration performed by multithreading according to an embodiment.

A so-called multithread is a technology for implementing concurrent execution of a plurality of threads on software or hardware. A computer with a multithreading capability can execute the plurality of threads at the same time due to hardware support, and this improves overall processing performance. As shown in FIG. 4, when a processor of a computing system has six available threads, this means that the processor may perform six different operations at the same time. In this case, the six available threads may be divided into two parts. Three threads of the six available threads are configured to migrate the first part of data from the source-end memory 120 to the destination-end memory 121, and may implement simultaneous transmission of three pieces of memory data in different locations, to increase a memory data migration speed. The other three threads may be configured to flush the second part of data to a disk, for example, the second part of data is transmitted from the source-end memory 120 to the shared storage device 140.

A corresponding transmission method is used, based on an architecture of the computer apparatus, for the data transmission between different nodes. For example, the transmission may be performed through an interconnection link between CPUs according to a cache coherence protocol.

S304: Migrate a second part of data from the source-end memory 120 to a shared storage device 140.

The source-end memory 120 and the destination-end memory 121 are located in a same computer apparatus, and the computer apparatus 110 has the shared storage device 140 that can be read by both the source-end memory 120 and the destination-end memory 121. Because data in the source-end memory 120 mostly comes from the shared storage device 140, only a small amount of incremental data in a service running process needs to be written back into the shared storage device 140. For example, modified memory data may be written back into the shared storage device based on the LRU algorithm, the LFU algorithm, or the like. The modified memory data herein not only includes modification of original data, but also includes newly added memory data.

Because only the small amount of incremental data needs to be written back when the second part of data is written from the source-end memory 120 into the shared storage device 140, most data has been stored in the shared storage device 140. Therefore, when the memory migration is performed in this manner, data transmission efficiency of this manner is far higher than that of the migration of the data from the source-end memory 120 to the destination-end memory 121.

Optionally, when the destination-end memory 121 needs to use the second part of data, all or some of the second part of data may be read from the shared storage device 140.

After the to-be-migrated is all migrated, the memory data migration ends. For example, when the first part of data included in the to-be-migrated data is all written from the source-end memory 120 into the destination-end memory 121, and the second part of data is all written from the source-end memory 120 into the shared storage device 140, the memory data migration ends.

Figure 5:
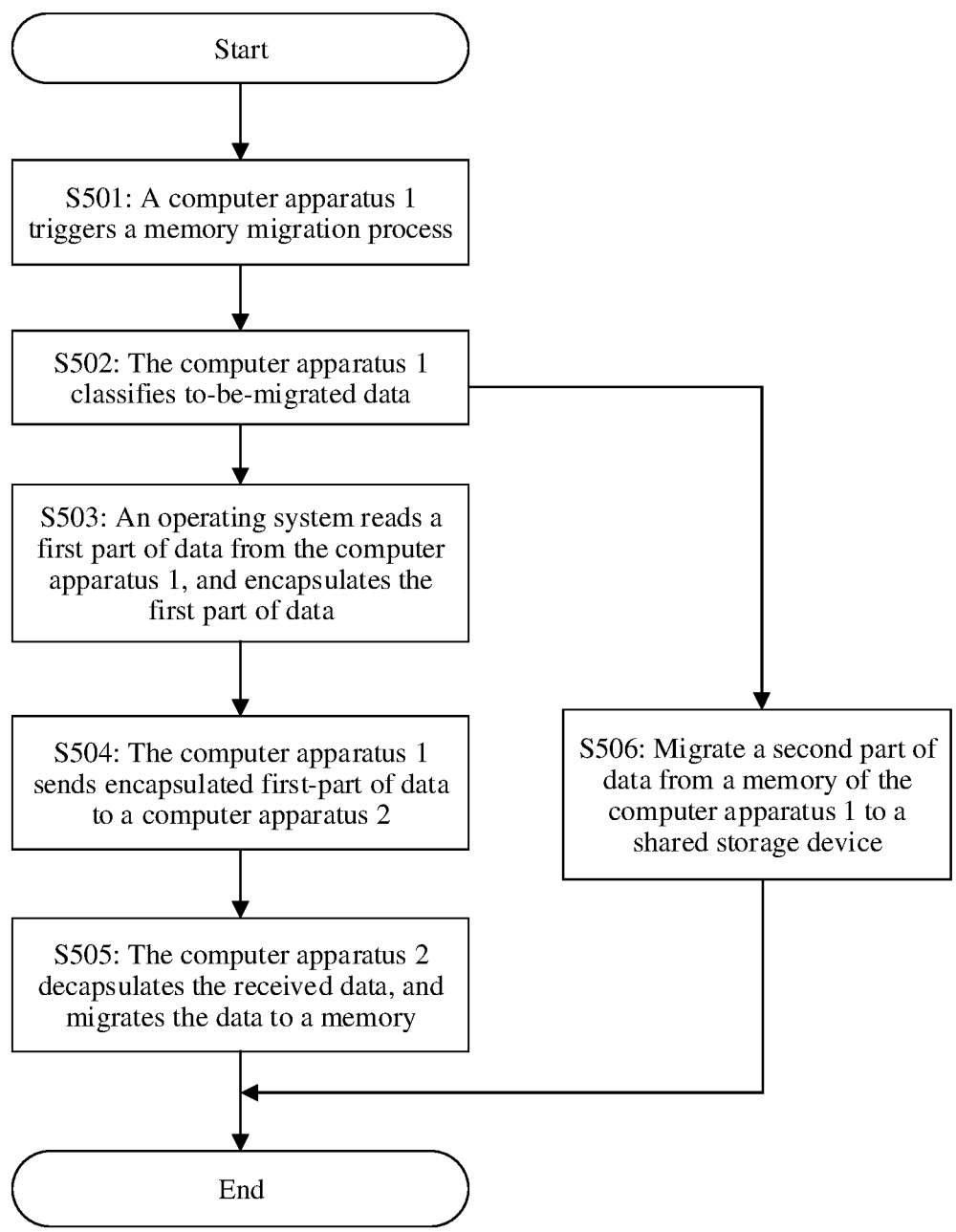
FIG. 5 is a schematic flowchart of another embodiment according.

FIG. 5 is a schematic flowchart of another embodiment. The schematic flowchart shows that memory data migration is performed between two computer apparatuses in the computing system shown in FIG. 2. As shown in FIG. 5, a procedure may be divided into the following steps.

S501: A computer apparatus 210 triggers a memory data migration process.

In the computing system shown in FIG. 3, memory data migration is performed between the computer apparatus 210 and the computer apparatus 211. The computer apparatus 210 is used as a source end, and the computer apparatus 211 is used as a destination end. The source-end computer apparatus 210 may trigger the memory migration process.

Optionally, the destination-end computer apparatus 211 or another computer apparatus in the computing system 200 may trigger the memory migration process. This is not limited in the embodiments.

S502: The computer apparatus 210 classifies to-be-migrated data.

Similar to the step S302, a memory daemon in a source-end memory 220 in the source-end computer apparatus 210 classifies the to-be-migrated data into two parts. A first part of data is written from the source-end memory 220 into a destination-end memory 221, and a second part of data is written into a shared storage device 240. For classification of the to-be-migrated data, refer to the step S302.

S503: An operating system 260 reads a first part of data from the computer apparatus 210 and encapsulates the first part of data.

When the source-end memory 220 and the destination-end memory 221 are separately located in two different computer apparatuses in the computing system 200, the source-end memory 220 cannot directly transmit data to the destination-end memory 221. The operating system 260 of the computer apparatus 210 reads the first part of data from the source-end memory 220 and encapsulates the first part of data. Usually, the first part of data is encapsulated according to the TCP/IP protocol, and the encapsulated first part of data carries information about a destination address, so that the encapsulated data is transmitted to the destination-end memory 221 in the computer apparatus 211 in a subsequent operation.

S504: The computer apparatus 210 sends encapsulated first-part of data to a computer apparatus 211.

After completing encapsulating the first part of data, the operating system 260 of the computer apparatus 210 sends the encapsulated first part of data to the computer apparatus 211.

S505: The computer apparatus 211 decapsulates the received data and transmits the data to a destination-end memory 221.

An operating system 261 of the computer apparatus 211 receives the encapsulated to-be-migrated data sent by the computer apparatus 210, decapsulates the encapsulated to-be-migrated data, and transmits the decapsulated to-be-migrated data to the destination-end memory 221 in the computer apparatus 211 based on the carried information about the destination address.

S506: The computer apparatus 210 migrates a second part of data to a shared storage device 240.

For the second part of data, the computer apparatus 210 transmits the second part of data to the shared storage device 240, and the data in the shared storage device 240 may be read by the computer apparatus 211. Because the to-be-migrated data is classified into the two parts and separately transmitted to the destination-end memory 221 and the shared storage device 240, bandwidth for data transmission actually increases, and this improves memory data migration efficiency.

Optionally, when the destination-end memory 221 needs to use the second part of data, all or some of the second part of data may be read from the shared storage device 240.

In an implementation of the embodiments, if data in the source-end memory 220 in the computer apparatus 210 mostly comes from the shared storage device 240, and when only a small amount of incremental data in a service running process needs to be written back into the shared storage device 240, modified memory data may be written back into the shared storage device 240 based on an LRU algorithm, an LFU algorithm, or the like. When the memory data migration is performed in this manner, only the small amount of incremental data needs to be written back, and most data has already been stored in the shared storage device 240. Therefore, data transmission efficiency may be further improved.

After the to-be-migrated is all transmitted, the memory data migration ends. For example, when the first part of data included in the to-be-migrated data is all written from the source-end memory 220 of the computer apparatus 210 into the destination-end memory 221 of the computer apparatus 211, and the second part of data is all written from the source-end memory 220 to the shared storage device 240, the memory data migration ends.

Figure 6:
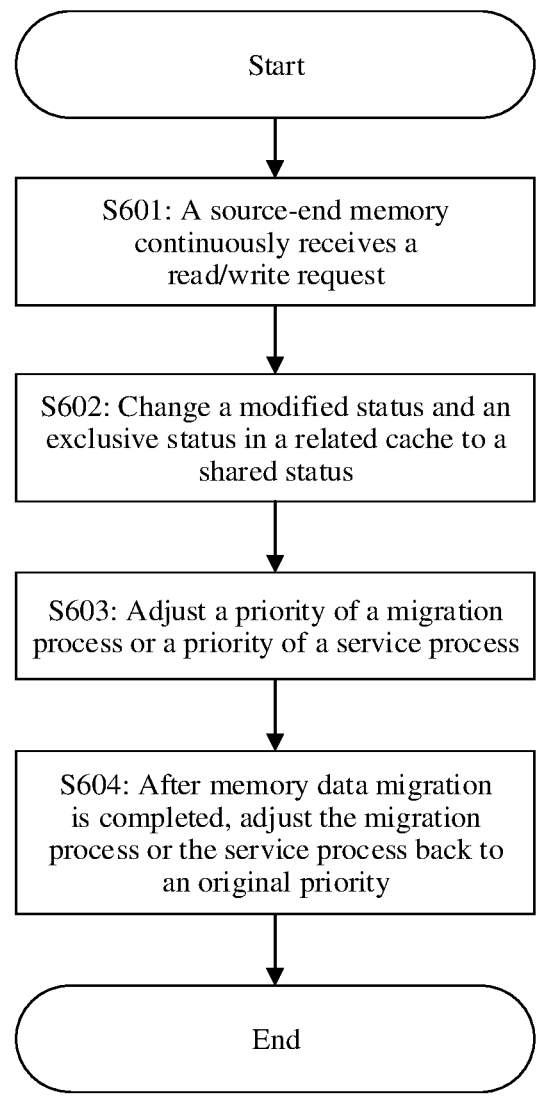
FIG. 6 is a schematic flowchart of another embodiment according.

FIG. 6 is a schematic flowchart of another embodiment. A procedure further details the step S303 in the procedure shown in FIG. 3 and the steps S503 to S505 in the procedure shown in FIG. 5. The procedure shown in FIG. 6 may be used to perform memory data migration between different nodes of a computer apparatus in the computing system shown in FIG. 1, and may also be used to perform memory data migration between two computer apparatuses in the computing system shown in FIG. 2. As shown in FIG. 6, this embodiment includes the following steps.

S601: A source-end memory continuously receives a read/write request.

During memory data migration, a computer apparatus may have comparatively high service pressure, and the computer apparatus may also generate new data. For example, in a high-performance analytic appliance (HANA) scenario, a memory is frequently accessed, and a service process may need to read and use to-be-migrated data. If a currently migrated memory page is occupied by the service process, the memory data migration process waits until the memory resource is released. Therefore, when the source-end memory continuously receives the read/write request, the following operations need to be performed.

S602: Change a modified status and an exclusive status in a related cache to a shared status.

In a multi-node system, each CPU has its own cache, and cache coherence is easy to be damaged. Therefore, a cache coherence protocol is required to ensure consistency of data in caches of a plurality of CPUs. One type of cache coherence protocol is an MESI. The MESI protocol uses M, E, S, and I to respectively represent a modified (M) cache status, an exclusive (E) cache status, a shared (S) cache status, and an invalid (I) cache status. The protocol maintains a status tag for each cache line, and this tag is attached after a physical address or data of the cache line. A cache line in the "modified" status is because a corresponding CPU recently performs data modification on the cache line, and it is ensured that data in a same memory address does not appear in another CPU cache. The exclusive status indicates that a cache line is exclusively occupied by a CPU, in other words, there is only one cache line in a cache, and the cache line does not exist in another CPU cache or is in the invalid state. A cache line in the "shared" status may exist in one or more CPU caches and is shared by the one or more CPU caches. Data cannot be stored in the cache line without permission of another CPU. A cache line in the "invalid" status is invalid, which is equivalent to that there is no data in the cache line.

Because data in the source-end memory needs to be transmitted to a destination end, when the source-end memory receives the write request of another process, a status of the source-end memory is changed to "shared" according to the cache coherence protocol. This means that the data in the source-end memory may be replicated to another CPU cache. In addition, data cannot be stored in the source-end memory without permission of another CPU.

S603: Adjust a priority of a memory data migration process or a service process, to enable the priority of the migration process to be higher than the priority of the service process related to the source end memory.

To ensure that memory data migration efficiency is not affected by the service process, the priority of the memory data migration process is adjusted to be higher than the priority of the service process related to the current source-end memory, or the priority of the service process related to the source-end memory is adjusted to be lower than the priority of the current memory data migration process, in other words, the service process is blocked to ensure that the memory data migration is first performed.

S604: After memory data migration is completed, adjust the memory data migration process or the service process back to an original priority.

Figure 7:
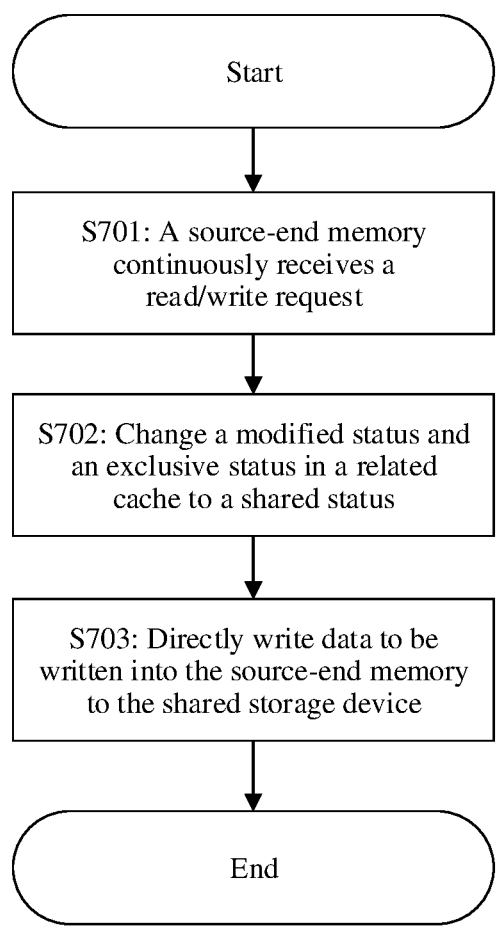
FIG. 7 is a schematic flowchart of another embodiment according.

FIG. 7 is a schematic flowchart of another embodiment. A procedure further details the step S303 in the procedure shown in FIG. 3 and the steps S503 to S505 in the procedure shown in FIG. 5. The procedure described in FIG. 7 may be used to perform memory data migration between different nodes of a computer apparatus in the computing system shown in FIG. 1, and may also be used to perform memory data migration between two computer apparatuses in the computing system shown in FIG. 2. As shown in FIG. 7, this embodiment includes the following steps.

S701: A source-end memory continuously receives a read/write request.

S702: Change a modified status and an exclusive status in a related cache to a shared status.

S703: Directly write data to be written into the source-end memory into a shared storage device.

To ensure that memory data migration efficiency is not affected, after receiving the write request in a data migration process, the source-end memory may indicate to first directly write the data to be written into the source-end memory into the shared storage device. When the source-end memory needs to use the part of data, the part of data may be read from the shared storage device.

Optionally, if all data including the data to be written into the source-end memory needs to be migrated to a destination-end memory, the data to be written into the source-end memory may be directly written into the destination-end memory.

Figure 8:
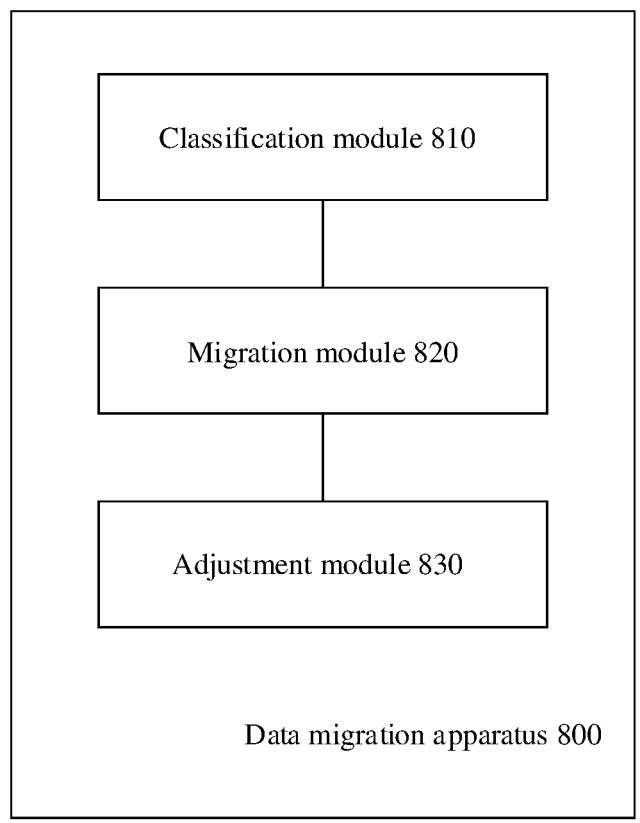
FIG. 8 is a schematic diagram of modules of a data migration apparatus according to an embodiment.

FIG. 8 is a schematic diagram of modules of a data migration apparatus according to the embodiments. As shown in FIG. 8, the data migration apparatus 800 includes a classification module 810 and a migration module 820.

The classification module 810 is configured to classify to-be-migrated data into first to-be-migrated data and second to-be-migrated data, where the to-be-migrated data is located in a first memory.

The migration module 820 is configured to migrate the first to-be-migrated data to a second memory, and write the second to-be-migrated data into a storage device, where the storage device is a shared storage device of the first memory and the second memory.

The data migration apparatus 800 may further include an adjustment module 830, configured to: before the second to-be-migrated data is migrated to the second memory, adjust a priority of a migration process, where an adjusted priority of the migration process is higher than a priority of a service process; and after the second to-be-migrated data is migrated to the second memory, restore the priority of the migration process.

The data migration apparatus 800 is further configured to execute the memory data migration methods shown in FIG. 3, FIG. 5, FIG. 6, and FIG. 7. For example, the classification module 810 may be configured to perform steps such as S302 and S502; the migration module 820 may be configured to perform steps such as S303 to S304, S503 to S506, and S703; and the adjustment module 830 may be configured to perform steps such as S602 to S604 and S702.

Figure 9:
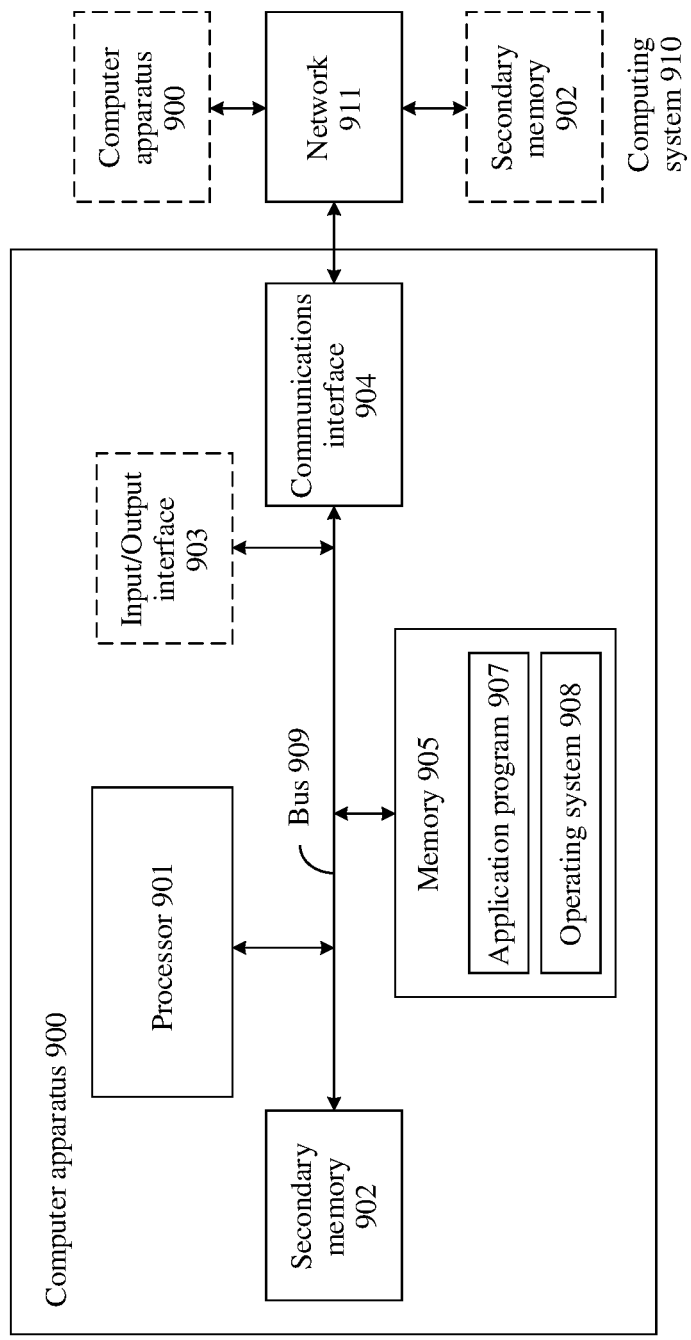
FIG. 9 is a schematic diagram of a structure of a computer apparatus according to an embodiment.

FIG. 9 is a schematic structural diagram of a computing system 910 according to an embodiment.

As shown in FIG. 9, the computing system 910 includes a computer apparatus 900. The computer apparatus 900 includes a processor 901, and the processor 901 is connected to a system memory 905. The processor 901 may be a computing logic, for example, a CPU, a graphics processing unit (GPU), a field programmable gate array (FPGA), or a digital signal processor (DSP), or a combination of any of the foregoing computing logics. The processor 901 may be a single-core processor or a multi-core processor.

A bus 909 is configured to transmit information between components of the computer apparatus 900. The bus 909 may use a wired connection manner or a wireless connection manner. This is not limited in the embodiments. The bus 909 is further connected to a secondary memory 902, an input/output interface 903, and a communications interface 904.

The secondary memory 902 is usually also referred to as an external memory. A storage medium of the secondary memory 902 may be a magnetic medium (for example, a floppy disk, a hard disk, or a magnetic tape), an optical medium (for example, a compact disc), a semiconductor medium (for example, a solid-state drive (SSD)), or the like. In some embodiments, the secondary memory 902 may further include a remote memory separated from the processor 901, for example, a web disk (including a network or cluster file system such as a network file system (NFS)) accessed through the communications interface 904 and a network 911.

The input/output interface 903 is connected to an input/output device, and is configured to receive input information, and output an operation result. The input/output device may be a mouse, a keyboard, a display, a CD-ROM drive, or the like.

The communications interface 904 uses, for example, but is not limited to, a transceiver apparatus such as a transceiver, to implement communication with another device or the network 911. The communications interface 904 may be interconnected to the network 911 in a wired or wireless manner.

In this embodiment, some features may be implemented/supported by the processor 901 by executing software code in the memory 905. The memory 905 may include some software, for example, an operating system 908 (such as Darwin, RTXC, LINUX, UNIX, OS X, WINDOWS, or an embedded operating system (for example, Vxworks)), an application program 907, or the like.

In addition, FIG. 9 is merely an example of the computing system 910. The computing system 910 may include more or fewer components than those shown in FIG. 9 or have different component configuration manners. For example, if the computing system 900 is corresponding to the multi-node structure shown in FIG. 1, the computer apparatus 900 includes at least two processors and at least two memories, and this part is not shown in the figure. In addition, each component shown in FIG. 9 may be implemented by hardware, software, or a combination of hardware and software.

The invention claimed is:

1. A data migration method applied to a computing system, the computing system comprising a first memory and a second memory, and the method comprises:
dividing to-be-migrated data into first to-be-migrated data and second to-be-migrated data based on a least recently used (LRU) algorithm or a least frequently used (LFU) algorithm, wherein the to-be-migrated data is located in the first memory;

migrating, bypassing a storage device, the first to-be-migrated data to the second memory; and writing the second to-be-migrated data into the storage device, wherein the storage device is a shared storage device of the first memory and the second memory.

2. The data migration method according to claim 1, wherein the computing system comprises a service process and a migration process, the migration process is used to migrate the to-be-migrated data, the service process is a process using the to-be-migrated data, and the method further comprises:

before the migrating of the first to-be-migrated data to the second memory, adjusting a priority of the migration process or a priority of the service process to enable the priority of the migration process to be higher than the priority of the service process.

3. The data migration method according to claim 2, wherein the method further comprises:

after the migrating of the first to-be-migrated data to the second memory, restoring the priority of the migration process or the priority of the service process.

4. The data migration method according to claim 2, wherein the data migration method is executed by a plurality of threads of the migration process when an amount of the to-be-migrated data is greater than a preset value, or the to-be-migrated data is discontinuous in the first memory.

5. The data migration method according to claim 1, further comprising:

generating, by the computing system, new data; and writing the new data into the storage device.

6. The data migration method according to claim 1, wherein the computing system comprises at least two computer apparatuses, the first memory is located in a first computer apparatus of the at least two computer apparatuses, and the second memory is located in a second computer apparatus of the at least two computer apparatuses.

7. The data migration method according to claim 1, further comprising:

reading third data from the storage device, and writing the third data into the second memory, wherein the second to-be-migrated data comprises the third data.

8. A data migration apparatus, comprising:

a first memory; and a processor coupled to the first memory and configured to execute instructions to:

divide to-be-migrated data into first to-be-migrated data and second to-be-migrated data based on a least recently used (LRU) algorithm or a least frequently used (LFU) algorithm, wherein the to-be-migrated data is located in the first memory;

migrate, bypassing a storage device, the first to-be-migrated data to a second memory, and write the second to-be-migrated data into the storage device, wherein the storage device is a shared storage device of the first memory and the second memory.

9. The apparatus according to claim 8, wherein the data migration apparatus runs a service process and a migration process, the migration process is used to migrate the to-be-migrated data, the service process is a process using the to-be-migrated data, and the processor is configured to execute instructions to:

before the first to-be-migrated data is migrated to the second memory, adjust a priority of the migration process or a priority of the service process, to enable the priority of the migration process to be higher than the priority of the service process.

10. The apparatus according to claim 9, wherein the processor further configured to execute instructions to:

after the first to-be-migrated data is migrated to the second memory, restore the priority of the migration process or the priority of the service process.

11. The apparatus according to claim 8, wherein the processor further configured to execute instructions to:

when the computing system generates new data, write the new data into the storage device.

12. The apparatus according to claim 9, wherein the apparatus runs a plurality of threads of the migration process in response to an amount of the to-be-migrated data is greater than a preset value, or the to-be-migrated data is discontinuous in the first memory.

13. The apparatus according to claim 8, wherein the processor further configured to execute instructions to:

read third data from the storage device and write the third data into the second memory, wherein the second to-be-migrated data comprises the third data.

14. A computing system, comprising a migration apparatus, a first memory, a second memory, and a storage device, wherein the migration apparatus is configured to:

divide to-be-migrated data into first to-be-migrated data and second to-be-migrated data based on a least recently used (LRU) algorithm or a least frequently used (LFU) algorithm, wherein the to-be-migrated data is located in the first memory, migrate, bypassing the storage device, the first to-be-migrated data to the second memory, and write the second to-be-migrated data into the storage device;

the storage device is configured to receive the second to-be-migrated data, wherein the storage device is a shared storage device of the first memory and the second memory.

15. The computing system according to claim 14, wherein the computing system comprises a service process and a migration process, the migration process is used to migrate the to-be-migrated data, the service process is a process using the to-be-migrated data, and the migration apparatus is configured to: before the first to-be-migrated data is migrated to the second memory, adjust a priority of the migration process or a priority of the service process to enable the priority of the migration process to be higher than the priority of the service process.

16. The computing system according to claim 15, wherein the migration apparatus is configured to run a plurality of threads of the migration process in response to an amount of the to-be-migrated data is greater than a preset value, or the to-be-migrated data is discontinuous in the first memory.

17. The computing system according to claim 14, wherein the computing system comprises at least two computer apparatuses, the first memory is located in a first computer apparatus of the at least two computer apparatuses, and the second memory is located in a second computer apparatus of the at least two computer apparatuses.

* * * * *